United States Patent Office 3,222,251
Patented Dec. 7, 1965

3,222,251
METHOD OF ELIMINATING HELMINTHS WITH CADMIUM COMPOUNDS
Kenneth K. Wyckoff, Ashland, Ohio, and James E. Guthrie, deceased, late of Beltsville, Md., by Magdelene Guthrie, legal representative, Ashland, Ohio; said Wyckoff assignor to Richardson-Merrell, Inc., New York, N.Y., a corporation of Delaware
No Drawing. Filed Aug. 18, 1961, Ser. No. 163,378
(Filed under Rule 47(a) and 35 U.S.C. 116)
5 Claims. (Cl. 167—53)

This invention relates to the treatment for removal of helminths from domestic animals and especially dogs and swine. The invention is particularly concerned with removal of the large roundworm *Ascaris lumbricoides* from swine.

This application is a continuation-in-part of application Serial No. 843,654, filed October 1, 1959 now abandoned, and of copending application Serial No. 163,377, filed May 31, 1961.

It is well known that domestic animals are commonly infested with helminths such as roundworms. *Ascaris lumbricoides* is probably the most universally encountered roundworm parasite of swine. This worm exerts a deleterious effect on the animal inasmuch as infested swine fail to grow normally and, in some cases where a large number of these parasites are harbored, the animal's resistance is reduced to the point where death occurs.

Swine are presently administered certain cadmium compounds, such as cadmium oxide and cadmium anthranilate, in the feed to induce elimination of roundworms. See Guthrie United States Patent No. 2,797,182 and Blair United States Patent No. 2,696,455. Although this method has been successful, it is not entirely satisfactory because of the increased cost of mixing the cadmium containing compound in the feed and the necessity for removing the regular ration from the feeders before offering the special medicated feed.

It has now been discovered according to one aspect of the present invention that water soluble cadmium sulfonates can be administered in the drinking water to remove roundworms at concentrations which are highly effective for the purpose but significantly below toxic levels. Furthermore, the treatment of swine in this manner does not adversely affect growth or weight gain.

This discovery is considered unexpected since the inorganic cadmium salts, which are water soluble, such as cadmium chloride, are not suitably administered to swine in the drinking water because of their high toxicity and lack of tolerance in this form.

Although water soluble cadmium salts can be administered in drinking water, they are generally toxic and therefore of no practical utility. It was completely unexpected that the water soluble cadmium salts of aliphatic and aromatic sulfonic acids are administrable in water without exhibiting toxic symptoms in the animal and are therefore advisably used. The aromatic sulfonic acid water soluble cadmium salts which can be used have the formulas:

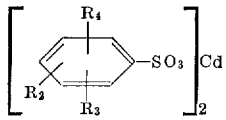

and

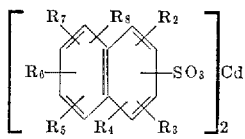

wherein $R_2$, $R_3$, $R_4$, $R_5$, $R_6$, $R_7$ and $R_8$ represent the same or different members of the group consisting of hydrogen, or a halogen, lower alkyl, hydroxy, lower alkoxy, amino, nitro, carboxy, carb-lower alkoxy, sulfo, mercapto and lower alkylthio groups. The aliphatic sulfonic acid water soluble cadmium salts which can be used have the formula:

$$[R_1—SO_3]_2Cd$$

wherein $R_1$ is a straight or branched alkyl group of 1 to 16 carbons, said alkyl group being unsubstituted or substituted with one or more groups such as carboxy, carb-lower alkoxy, halogen, amino, sulfo, nitro, hydroxy, mercapto, lower alkoxy and thio-lower alkoxy groups.

By the term "water soluble" as used herein is meant that the compound is soluble in water to an extent such that the quantity of drinking water normally consumed by the domestic animal, and particularly a pig, will contian a sufficient concentration of the cadmium compound to induce an anthelmintic effect.

Representative of cadmium sulfonates which can be used in the treatment of swine infested with roundworms are Cadmium benzenesulfonate,
Cadmium p-toluenesulfonate,
Cadmium p-chlorobenzenesulfonate,
Cadmium p-bromobenzenesulfonate,
Cadmium p-phenolsulfonate,
Cadmium sulfanilate,
Cadmium ethanesulfonate,
Cadmium 3-carboxy-4-hydroxybenzenesulfonate,
Cadmium butanesulfonate,
Cadmium methanesulfonate,
Cadmium 2-propanesulfonate,
Cadmium p-carboxybenzenesulfonate,
Cadmium p-carbomethoxybenzenesulfonate,
Cadmium p-nitrobenzenesulfonate,
Cadmium p-methoxybenzenesulfonate,
Cadmium p-thioanisylsulfonate,
Cadmium o-aminobenzenesulfonate,
Cadmium 5-amino-2-chlorobenzenesulfonate,
Cadmium 4-amino-m-toluenesulfonate,
Cadmium 6-amino-m-toluenesulfonate,
Cadmium 5-amino-o-toluenesulfonate,
Cadmium p-carbethoxybenzenesulfonate,
Cadmium p-fluorobenzenesulfonate,
Cadmium p-iodobenzenesulfonate,
Cadmium 5-nitro-2-chlorobenzenesulfonate,
Cadmium 5-nitro-o-toluenesulfonate,
Cadmium 2-amino-3,5-dimethylbenzenesulfonate,
Cadmium 4-sulfo-2-aminobenzenesulfonate,
Cadmium 6-thymolsulfonate,
Cadmium 1-carboxypentadecanesulfonate (inner salt),
Cadmium 2-nitrobutanesulfonate, and
Cadmium 2,4-dinitro-1-naphthol-7-sulfonate.

The efficacy of cadium sulfonates in the removal of *Ascaris lumbricoides* from swine was determined by the procedure of Morris C. Hall and Winthrop D. Foster "Efficacy of Some Anthelmintics," J. of Agr. Research, 12, 7 (1918). This method was reviewed by Moskey and Harwood in 1941: "Methods of Evaluating the Efficacy of Anthelmintics"; Henry E. Moskey and Paul D. Harwood, Am. J. Veterinary Research, 2, 55–59 (1941).

As is understood in the veterinary art, this critical test, which has been used by investigators for several years to arrive at the actual efficiency of anthelmintic preparations, utilizes each animal tested as its own control. For each animal, the worms eliminated in the feces are counted and then compared with the number of worms remaining in the animal at necropsy. The general procedure for determining the anthelmintic efficacy of the cadmium sulfonates was as follows: Each pig was weighed at the beginning of the experiment and placed in separate pens which had concrete floors and contained individual feeding troughs and watering troughs. The animal was fed a ration containing ingredients which are recognized to furnish the nutritional elements necessary for normal growth.

The cadmium sulfonate being tested was administered in the drinking water for three consecutive days. Medicated water was given to all animals, ad lib. In all cases an accurate record of the amount of water, and therefore the quantity of drug consumed, was maintained. The feces were collected daily and examined for *Ascaris lumbricoides*. This procedure consisted of placing the fecal material on a wire screen and washing it with a stream of water. The feces are easily washed through the screen and the large roundworms remain on the screen. As an added precaution, at least one screen of finer mesh than the original screen was, and occasionally two such screens were, placed below the screen receiving the fecal material to eliminate the possibility of a worm passing through the first screen and being lost. Such a loss would not result in the true anthelmintic efficacy of the drug being tested. This screening procedure was continued for fourteen (14) consecutive days beginning on the first day of treatment. At the termination of each test, the animal was weighed, sacrificed and the intestinal tract examined for the presence of large roundworms. This latter procedure consisted of slitting open the intestines of the animal and washing the intestinal contents through the screens in the same manner as that described above for inspecting the feces for worms. The total number of *Ascaris lumbricoides* present at the initiation of this test was the sum of the number of worms eliminated in the feces plus those present in the intestine at necropsy. From these data, the anthelmintic efficacy of each drug was determined. Unless otherwise indicated, the drug was in the anhydrous state.

EXPERIMENT 1

A series of cadmium sulfonates was administered in the drinking water to individual pigs for three consecutive days. Cadmium p-carboxybenzenesulfonate was given in ordinary tap water. The remaining compounds were given in water previously adjusted to pH 5.7–6.3 with hydrochloric acid. All animals were on full feed and plain water prior to treatment and each pig was weighed at treatment and at fourteen days. The feces were examined for *Ascaris lumbricoides* each day of the experiment and at necropsy the number of ascarids remaining in the test animal was determined. The experimental data and efficacies of these cadmium compounds are given in Table I.

TABLE I.—EFFICACY OF SOME CADMIUM SULFONATE COMPOUNDS ADMINISTERED IN THE DRINKING WATER FOR REMOVAL OF *ASCARIS LUMBRICOIDES* FROM SWINE

[Note: All animals were necropsied 14 days after treatment started]

| Pig No. | Weight, lbs. At treatment | Weight, lbs. At necropsy | Mean daily gain, lbs. | Drug and percent cadmium | Concentration of drug, gm./gal. | Days treated, number | Cadmium consumption, mg./lb.[1] | Ascarids Eliminated, number | Ascarids At necropsy, number | Efficacy, percent |
|---|---|---|---|---|---|---|---|---|---|---|
| 54 | 52.0 | 72.5 | 1.46 | Cd benzenesulfonate—26.33% | 1.5 | 3 | 24.3 | 31 | 0 | 100 |
| 32 | 96.5 | 101.0 | 0.32 | Cd p-bromobenzensulfonate—19.22% | 1.5 | 3 | 20.2 | 37 | 3 | 92.5 |
| 38 | 130.0 | 167.5 | 2.65 | Cd p-carboxybenzensulfonate .4H₂O—19.15%. | 1.5 | 3 | 18.4 | 5 | 0 | 100 |
| 139 | 133.5 | 162.5 | 2.07 | Cd p-chlorobenzenesulfonate—22.68% | 2.7 | 3 | 25.5 | 8 | 0 | 100 |
| 39 | 96.5 | 101.5 | 0.36 | Cd ethanesulfonate—33.99% | 1.5 | 3 | 22.7 | 8 | 2 | 80 |
| 52 | 67.5 | 92.5 | 1.79 | Cd methanesulfonate .2H₂O—37.14% | 1.5 | 3 | 29.0 | 11 | 1 | 91.6 |
| 12 | 101.5 | 138.0 | 2.61 | Cd p-nitrobenzenesulfonate—21.75% | 1.5 | 3 | 20.1 | 14 | 5 | 73.7 |
| 33 | 96.0 | 98.0 | 0.14 | Cd p-phenolsulfonate .2H₂O—22.71% | 1.5 | 3 | 13.8 | 42 | 15 | 73.7 |
| 53 | 55.0 | 76.0 | 1.50 | Cd 2-propanesulfonate—31.33% | 1.5 | 3 | 33.6 | 4 | 1 | 80 |
| 45 | 58.5 | 78.0 | 1.40 | Cd sulfanilate—24.60% | 1.5 | 3 | 20.5 | 41 | 9 | 82 |

[1] Initial weight.

EXPERIMENT 2

Cadmium p-toluenesulfonate in the drinking water at various concentrations was given to twenty nine (29) pigs. The water was previously adjusted to pH 6.3 with hydrochloric acid. The protocol followed was that out- TABLE II.—EFFICACY OF CADMIUM p-TOLUENESULFONATE (22.68%) ADMINISTERED IN THE DRINKING WATER FOR REMOVAL OF *Ascaris Lumbricoides* FROM SWINE

[Note: All animals were necropsied 14 days after treatment started. pH of water adjusted to 6.3 with HCl]

| Pig No. | Weight, lbs. At treatment | Weight, lbs. At necropsy | Mean daily gain, lbs. | Concentration of drug, gm./gal. | Days treated, number | Cadmium consumption, mg./lb.[1] | Ascarids Eliminated, number | Ascarids At necropsy, number | Efficacy, percent |
|---|---|---|---|---|---|---|---|---|---|
| 67 | 99.5 | 120.0 | 1.46 | 0.45 | 3 | 3.3 | 27 | 13 | 67.5 |
| 51 | 100.0 | 126.5 | 1.89 | 0.9 | 3 | 6.7 | 5 | 4 | 55.5 |
| 46 | 179.0 | 200.4 | 1.53 | 1.1 | 3 | 4.5 | 2 | 0 | 100 |
| 36 | 196.5 | 226.2 | 2.12 | 1.25 | 3 | 17.4 | 10 | 0 | 100 |
| 58 | 94.5 | 110.8 | 1.17 | 1.25 | 1 | 6.5 | 13 | 30 | 30.2 |
| 38 | 134.0 | 162.4 | 2.03 | 1.25 | 3 | 11.0 | 21 | 0 | 100 |
| 53 | 45.0 | 63.4 | 1.31 | 1.25 | 3 | 22.3 | 3 | 1 | 75 |
| 63 | 148.5 | 176.9 | 2.03 | 1.25 | 3 | 11.3 | 8 | 1 | 88 |
| 3 | 60.5 | 88.0 | 1.96 | 1.25 | 3 | 17.0 | 8 | 0 | 100 |
| 7 | 48.0 | 79.5 | 2.25 | 1.25 | 3 | 22.9 | 6 | 5 | 54.5 |
| 9 | 47.5 | 72.5 | 1.79 | 1.25 | 3 | 16.9 | 15 | 14 | 51.7 |
| 10 | 59.0 | 86.0 | 1.93 | 1.25 | 3 | 18.2 | 5 | 4 | 55.5 |
| 17 | 63.5 | 97.0 | 2.39 | 1.25 | 3 | 21.9 | 6 | 2 | 75 |
| 22 | 78.0 | 113.0 | 2.50 | 1.25 | 3 | 15.8 | 6 | 1 | 85.7 |
| 59 | 48.0 | 61.1 | 0.94 | 1.4 | 3 | 11.1 | 22 | 8 | 73.3 |
| 61 | 71.0 | 98.1 | 1.93 | 1.42 | 3 | 7.4 | 15 | 18 | 45.4 |
| 16 | 78.5 | 106.5 | 2.0 | 1.5 | 3 | 22.3 | 15 | 8 | 65.2 |
| 28 | 56.0 | 87.0 | 2.21 | 1.5 | 3 | 26.0 | 62 | 0 | 100 |
| 21 | 58.0 | 85.0 | 1.93 | 1.5 | 3 | 22.4 | 41 | 3 | 93.2 |
| 46 | 93.0 | 94.0 | [2]0.07 | 1.5 | 3 | 11.5 | 2 | 16 | 11.1 |
| 35 | 81.5 | 78.0 | [2]0.25 | 1.5 | 3 | 13.8 | 88 | 33 | 72.7 |
| 36 | 77.5 | 79.0 | [2]0.10 | 1.5 | 3 | 13.0 | 5 | 2 | 72.5 |
| 44 | 87.5 | 97.0 | [2]0.67 | 2.25 | 2 | 17.4 | 13 | 4 | 76.5 |
| 2 | 156.5 | 163.0 | [2]0.46 | 2.25 | 2 | 13.2 | 9 | 3 | 75 |
| 47 | 54.0 | 50.0 | [2]−0.29 | 2.25 | 2 | 29.3 | 2 | 1 | 66.6 |
| 41 | 74.5 | 76.0 | [2]0.10 | 2.25 | 2 | 19.5 | 15 | 7 | 68.1 |
| 65 | 68.5 | 92.6 | 1.72 | 2.4 | 3 | 18.5 | 30 | 0 | 100 |
| 57 | 90.5 | 104.5 | 1.0 | 2.4 | 3 | 14.8 | 10 | 0 | 100 |
| 62 | 68.0 | 89.5 | 1.53 | 4.08 | 3 | 22.2 | 13 | 3 | 81.2 |

[1] Initial weight.  [2] These animals acquired a Salmonella infection during the test.

lined in Experiment 1 and the experimental data and the efficacies of the various medication levels are given in Table II. The pigs numbered 38, 53 and 63 were given the treatment ad lib and they consumed more water than was expected. A 50 lb. pig will drink about 0.69 gal. of water daily and a 150 lb. pig will drink about 1.5 gal. of water daily. The above pigs consumed 1.6, 1.08 and 1.82 gal. of water per day respectively.

EXPERIMENT 3

Cadmium benzenesulfonate was given to four (4) pigs at therapeutic levels of 1.5 g./gal. of water. The water used in this experiment had previously been adjusted to pH 6.3 with benzene sulfonic acid. The protocol followed for this experiment was the same as that given in Experiment 1. Experimental data and efficacies for the individual pigs are given in Table III.

sumption was below normal and three treatments with a combination of penicillin and streptomycin were necessary to save the animal. At necropsy, both lungs showed extensive consolidation.

Cadmium butanesulfonate at 4.0 gm./gal. removed all of 6 ascarids from a 133.5 lb. hog. Consumption of medicated water was 3.4 gals. Cadmium consumption was 29.6 mg./lb. of body weight. Although this animal consumed a very high dosage of cadmium, the 1.21 lb. mean daily gain was satisfactory.

Two animals were treated with cadmium p-methoxybenzenesulfonate. A dosage of 3.0 gm./gal. removed 54.5% of 11 ascarids from a 122 lb. shote which consumed 13.5 mg./lb. of cadmium. Medicated water intake of the 122 lb. animal was 2.84 gal. A 185 lb. hog eliminated 93.7% of 16 ascarids after a dosage of 5.0 gm./gal.

TABLE III.—EFFICACY OF CADMIUM BENZENESULFONATE ADMINISTERED IN DRINKING WATER FOR REMOVAL OF Ascaris Lumbricoides FROM SWINE

| Pig No. | Drug | Weight, lbs. | | Mean daily gain, lbs. | Dosage of drug, g./gal. | Days treated, number | Drug consumed, mg./lb.[1] | Ascarids | | Efficacy, percent |
|---|---|---|---|---|---|---|---|---|---|---|
| | | Initial | At necropsy | | | | | Removed, number | Remaining, number | |
| 3 | Cd benzenesulfonate | 115 | 139.5 | 1.75 | 1.5 | 3 | 26.08 | 8 | 1 | 88.8 |
| 102 | Cd benzenesulfonate | 225 | 232.5 | 0.54 | 1.5 | 3 | 12.32 | 4 | 24 | 14.3 |
| 103 | Cd benzenesulfonate | 199.5 | 212.5 | 0.93 | 1.5 | 3 | 33.0 | 0 | 0 | |
| 104 | Cd benzenesulfonate | 217.5 | 240 | 1.61 | 1.5 | 3 | 16.6 | 3 | 0 | 100 |

[1] Initial weight.

EXPERIMENT 4

The ascaricidal efficacy of some cadmium sulfonates administered in the drinking water for three consecutive days to naturally infected hogs was determined by the procedure of Experment 1. Neither feed nor water was withheld before treatment. Each hog was weighed at treatment and 14 days later, just prior to necropsy. All animals received medicated drinking water ad lib for three consecutive days (72 hours). Water consumption of each hog was recorded for the 3-day treatment period. All water used during treatment was adjusted to a pH of 6 as these chemicals are unstable in alkaline water.

With cadmium p-chlorobenzenesulfonate, there was a cadmium consumption of 14.2 mg./lb. and 93.9% removal of 33 worms from a 164.5 shote. Mean daily gain was 1.64 lbs. Consumption of medicated water was 5.9 gals.

A 158 lb. shote given 2.06 gm./gal. cadmium p-carboxy benzenesulfonate consumed 10.3 mg./lb. of cadmium and eliminated 80% of 9 worms. Daily gain was only 0.39 lb. Medicated water consumption was 4.13 gals. The poor gain was caused by a severe pneumonia. Feed con- During the 3 day treatment, 2.84 gal of water was consumed. Cadmium intake was 16.8 mg./lb. Both hogs showed a satisfactory rate of gain (1.41 lb./day and 1.71 lb./day respectively) during the experiment.

Cadmium p-carbomethoxybenzenesulfonate at 5.0 gm./gal. removed 100% of 19 ascarids from a 121 lb. hog. Three day water consumption was 3.34 gal. Total cadmium dosage was 28.6 mg./lb. The mean daily gain of 2.0 lb. was satisfactory.

With 5.0 gm./gal. of cadmium 3-carboxy-4-hydroxybenzenesulfonate, 100% of 20 ascarids were eliminated from a 144 lb. hog. It drank 3.06 gal. medicated water. Average daily gain was 1.75 lb. and consumption of cadmium was 20 mg./lb. of body weight.

At 5.0 gm./gal., cadmium p-thioanisylsulfonate removed 100% of 22 ascarids from a 101.5 lb. animal. Consumption of medicated water was 2.81 gal. Total cadmium intake of 30 mg./lb. exceeded that of any other cadmium compound tested. Mean daily gain of 2.96 lb. was also significantly greater than that of hogs treated with the other compounds.

The following Tabe IV summarizes these results.

TABLE IV.—ASCARICIDAL ACTIVITY OF CADMIUM COMPOUNDS ADMINISTERED IN THE DRINKING WATER FOR THREE CONSECUTIVE DAYS

[Note: All animals were necropsied 14 days after treatment]

| Pig No. | Weight, lbs. | | Mean daily gain, lbs. | Drug and Cd percent | Concentration of drug, gm./gal. | Cadmium consumption, mg./lb.[1] | Ascarids | | Efficacy, percent |
|---|---|---|---|---|---|---|---|---|---|
| | At treatment | At necropsy | | | | | Eliminated, number | Necropsy, number | |
| 15 | 164.5 | 187.5 | 1.64 | Cd p-chlorobenzenesulfonate—22.68% | 1.75 | 14.15 | 31 | 2 | 93.9 |
| 16 | 158.0 | 163.5 | [2] 0.39 | Cd p-carboxybenzenesulfonate-4H₂O—19.15% | 2.06 | 10.31 | 4 | 5 | 80 |
| 20 | 133.5 | 150.5 | 1.21 | Cd p-butanesulfonate—29.06% | 4.0 | 29.61 | 6 | 0 | 100 |
| 21 | 122.0 | 138.0 | 1.14 | Cd p-methoxybenzenesulfonate—23.07% | 3.0 | 13.5 | 6 | 5 | 54.5 |
| 27 | 185.0 | 209 | 1.71 | Cd p-methoxybenzenesulfonate-1.5H₂O—23.09% | 5.0 | 16.79 | 15 | 1 | 93.7 |
| 22 | 121.0 | 147.0 | 2.0 | Cd p-carbomethoxybenzenesulfonate—19.15% | 5.0 | 28.6 | 19 | 0 | 100 |
| 25 | 144.5 | 169.0 | 1.75 | Cd 3-carboxy-4-hydroxybenzenesulfonate-1H₂O—19.90%. | 5.0 | 21.07 | 20 | 0 | 100 |
| 29 | 101.5 | 142.5 | 2.96 | Cd p-thioanisylsulfonate—21.66% | 5.0 | 30 | 22 | 0 | 100 |

[1] Initial weight. [2] Contracted pneumonia; appetite was very poor during last week of test.

EXPERIMENT 5

The efficacy of various sulfonic salts of cadmium was also determined against *Toxocara canis* in the dog when administered in the drinking water. Dogs passing *Toxocara canis* eggs were weighed and placed in individual pens. Drug dosage was based upon milligrams of cadmium per kilogram of body weight per day. Each drug at the appropriate dosage was dissolved in approximately 50 cc. of water and placed in front of the dog for 24 hours. Plain water was provided after 24 hours, long enough to satisfy the dog's thirst and then withdrawn. The procedure was then repeated for the appropriate number of days.

Feces were washed daily and eliminated worms were counted. The dogs were sacrificed 48 hours after the passage of the last worm following treatment. Internal abnormalities were noted and the number of retained worms was recorded for determination of efficacy.

This test was standardized in the number of milligrams of cadmium so that all dogs received the same ratio of cadmium to body weight. The results are reported in Table V.

TABLE V

| Drug | Mg./Kg./Bw.[1] | Number of treatments | Total worms | Percent removed |
|---|---|---|---|---|
| Cadmium p-toluenesulfonate | 2.5 | 10 | 8 | 63 |
| Cadmium ethanesulfonate | 5 | 5 | 4 | 50 |
| Cadmium p-methoxy-benzenesulfonate | 5 | 5 | 13 | 85 |
| Do | 10 | 1 | 2 | 100 |
| Do | 10 | 5 | 24 | 29 |
| Do | 12 | 5 | 4 | 25 |
| Do | 14 | 5 | 45 | 56 |
| Do | 16 | 5 | 77 | 47 |
| Do | 18 | 5 | 5 | 80 |
| Do | 20 | 5 | 25 | 80 |
| Do | 2 | 10 | 13 | 23 |
| Do | 2.5 | 10 | 15 | 25 |
| Cadmium 4-sulfo-2-amino-benzene-sulfonate | 5 | 5 | 35 | 20 |
| Cadmium 2,4-dinitro-1-naphthol-7-sulfonate | 5 | 5 | 6 | 33 |
| Cadmium 5-nitro-o-toluenesulfonate | 5 | 5 | 27 | 89 |
| Do | 10 | 5 | 31 | 42 |
| Do | 12 | 5 | 35 | 57 |
| Do | 14 | 5 | 18 | 61 |
| Do | 16 | 5 | 28 | 50 |
| Do | 18 | 5 | 56 | 80 |
| Do | 20 | 5 | 11 | 63 |
| Do | 5 | 1 | 17 | 41 |
| Do | 2 | 10 | 12 | 33 |
| Cadmium 5-amino-2-chlorobenzene-sulfonate | 2.5 | 10 | 5 | 20 |
| Do | 5 | 5 | 24 | 88 |

[1] Dosage based on milligrams of cadmium per kilogram of body weight.

The water soluble cadmium sulfonates are generally provided in the drinking water at a concentration such that the resulting solution contains from about 0.1 to 1.50 gm. of cadmium metal per gallon of water, and advisably about 0.2 to 1.00 gm. of cadmium metal per gallon of water, to achieve the desired anthelmintic activity. Based upon the size of the pig being treated, and thus its expected water consumption, the concentration of the cadmium sulfonate can be adjusted so that the pig will take in about 5 mg. to 60 mg., and advisably 10 to 40 mg., of cadmium metal per pound of body weight. The length of treatment should generally be from about two to four days, with three days being preferred.

Since some of the cadmium sulfonates are unstable in alkaline water the pH of the drinking water can be lowered to about pH 6 as with hydrochloric acid to stabilize the solution. However, the broad pH range of about 3 to 6.50 is suitable although a pH of about 5.75 is generally optimum.

In order to facilitate administration of the active water soluble cadmium sulfonates to pigs, there are also provided by this invention novel concentrates and formulations for preparing the aqueous solutions. Thus, to stabilize the cadmium sulfonate when diluted with water to the proper concentration for drinking by the pigs, concentrates of the cadmium sulfonate mixed with a suitable amount of an acid are first prepared. A mineral acid such as hydrochloric or sulfuric acid, or an organic acid such as acetic, citric, lactic, benzoic and alkyl- or aryl-sulfonic acids, can be used for this purpose. Such concentrates are composed of sufficient and proper amounts of a cadmium sulfonate and acid such that the concentrate, upon dilution to the proper extent, will form a solution having the desired cadmium concentration and be at an acceptable pH for a stable solution. One typical concentrate may contain cadmium p-toluenesulfonate and p-toluenesulfonic acid.

Such concentrates can be either aqueous solutions or in dry form although obviously the latter can only be prepared from acids, as citric acid, which exist as solids at room temperature. A dry product could be made of cadmium-p-toluenesulfonate mixed with citric acid and the mixture packaged in a polyvinyl alcohol film. Such a package could be added directly to drinking water because polyvinyl alcohol is soluble in water.

Since many parasitized pigs are in poor condition, a nutrient including any one or all of the B vitamins such as nicotinic acid, riboflavin, thiamin or pyridoxine can be included in the formulations of cadmium sulfonate containing drinking water for the benefits they produce. In addition, flavoring agents can be included to increase acceptability of the product by the pigs. Saccharin is one agent that can be used to increase palatability.

Although it is generally most suitable to administer the cadmium sulfonates in the drinking water these materials can also be given in the feed for the animal. The following experiments illustrate the efficacy achieved by this treatment.

EXPERIMENT 6

The efficacy of various cadmium sulfonates was determined against *Toxocara canis* in the dog when administered in meal-type dog food for 14 days. The results are reported in Table VI.

TABLE VI

| Drug | Percent Cd in the feed | Mg./kg./Bw [1] | Total worms | Percent removal |
|---|---|---|---|---|
| Cadmium p.toluenesulfonate | .015 | 60 | 2 | 100 |
| Do | .020 | 158 | 3 | 100 |
| Do | .025 | 112 | 7 | 100 |
| Do | .030 | 186 | 4 | 100 |
| Cadmium p-methoxy-benzenesulfonate | .020 | 132 | 3 | 33 |
| Cadmium 5-nitro-o-toluenesulfonate | .015 | 51 | 2 | 100 |
| Do | .020 | 147 | 11 | 100 |
| Do | .025 | 198 | 1 | 100 |
| Do | .030 | 139 | 28 | 89 |
| Cadmium 5-amino-2-chlorobenzenesulfonate | .020 | 101 | 5 | 20 |

[1] Milligrams of cadmium consumed per kilogram of body weight over a 14 day period.

EXPERIMENT 7

The efficacy of various cadmium sulfonates was determined against *Toxocara canis* in the dog when administered in canned dog feed. The results are reported in Table VII.

TABLE VII

| Drug | Mg./kg./Bw.[1] | Number of Treatments | Total Worms | Percent Removal |
|---|---|---|---|---|
| Cadmium p-nitrobenzenesulfonate | 5 | 5 | 30 | 50 |
| Cadmium 2-propanesulfonate | 5 | 5 | 4 | 25 |
| Cadmium methanesulfonate | 5 | 5 | 9 | 56 |
| Cadmium p-thioanisylsulfonate | 5 | 5 | 18 | 56 |
| Cadmium 1-carboxypentadecanesulfonate (inner salt) | 5 | 5 | 35 | 57 |
| Cadmium 6-amino-m-toluenesulfonate | 5 | 5 | 67 | 61 |
| Cadmium 2-amino-3,5-dimethylbenzenesulfonate | 5 | 5 | 65 | 68 |
| Cadmium p-iodobenzenesulfonate | 5 | 5 | 4 | 50 |
| Cadmium 2-nitrobutanesulfonate | 5 | 5 | 16 | 38 |
| Cadmium o-aminobenzenesulfonate | 5 | 5 | 25 | 72 |
| Cadmium 5-amino-o-toluenesulfonate | 5 | 5 | 6 | 67 |
| Cadmium 5-amino-2-chlorobenzenesulfonate | 12 | 5 | 2 | 50 |
| Cadmium 4-amino-m-toluenesulfonate | 5 | 5 | 4 | 50 |

[1] Dosage based on milligrams of cadmium per kilogram of body weight.

EXPERIMENT 8

Various cadmium sulfonate compounds were administered in the feed for the removal of *Ascaris lumbricoides* from swine. The results are given in Table VIII following.

Treatment in feedstuffs gives good results at about 0.5 gm. to 6.0 gm. of active agent per 10 pounds of feedstuff. In general swine feeds could contain 0.003% to 0.10% of cadmium metal as a cadmium sulfonate.

It has also been found that the cadmium sulfonates are active against tape worms, such as *Taenia hydatigena* and *Echinococcus multilocularis*, in animals. Because of the relationship between *Echinococcus multilocularis* and *Echinococcus granulosus* it is to be expected that the compounds are also active against *E. granulosus* as well but because of the risk to the tester is not usually employed in testing.

In the treatment of tapeworms the compounds can be administered in the drinking water, in the feedstuffs, or in unit dosage forms such as capsules and tablets to the larger animals. The amount of cadmium ingestation needed for the treatment will vary from one animal species to another but can be determined readily by those skilled in the art. Feedstuffs could contain about 0.003% to 0.10% by weight of cadmium metal as a cadmium sulfonate.

For some unknown reason cadmium anthranilate, a very active compound against roundworms in swine is not effective against *Echinococcus multilocularis* in dogs when administered in the feed. This may have some relationship to the water insolubility of this compound.

The cadmium sulfonates which appear to be most active against tapeworms are cadmium 5-nitro-o-toluenesulfonate, cadmium 2,4-dinitrobenzenesulfonate and cadmium o-nitrobenzenesulfonate.

The following experiment illustrates the activity of the compounds against tapeworms in animals.

EXPERIMENT 9

Each test involved infecting 2 puppies which were littermates. Infection was achieved by feeding cystic material from cotton rats in equal amounts to the 2 dogs. One week after treatment both dogs were showing diarrhea, presumably because of the infection. At this time one dog was selected for treatment, and the drug offered to him in a mixture of feed. The dogs were fed the drug at several levels and for varying periods of time from 7 days up to 21 days. Neither the level nor the duration of treatment appeared to be critical under the conditions of these experiments so they are not reported for each animal. Two weeks after cessation of feeding the treated animal was killed and its intestinal tract examined for tapeworms. In every case the worms had been completely removed as indicated in the accompanying table.

At necropsy of each control dog an overwhelming infection of thousands of echinococci was found.

TABLE VIII

| Pig No. | Compound | Weight, lbs. At treatment | Weight, lbs. At necropsy | Mean daily gain, lbs. | Drug and concentration, gm./10 lbs. feed | Cadmium consumed, mg./lb. | Duration of treatment, days | Ascarids Eliminated, number | Ascarids At necropsy, number | Efficacy, percent |
|---|---|---|---|---|---|---|---|---|---|---|
| 78 | Cadmium o-aminobenzenesulfonate | 85.0 | 116.0 | 2.21 | 3 | 8.68 | 3 | 5 | 0 | 100 |
| 104 | Cadmium 4-sulfo-2-adminobenzenesulfonate | 59.0 | 83.5 | 1.75 | 3 | 8.09 | 3 | 22 | 1 | 95.7 |
| 53 | Cadmium p-iodobenzenesulfonate | 58.0 | 83.5 | 1.82 | 3 | 9.62 | 3 | 3 | 0 | 100 |
| 76 | Cadmium p-carbethoxybenzenesulfonate | 63.0 | 91.0 | 2.0 | 3 | 6.60 | 3 | 15 | 3 | 83.3 |
| 103 | Cadmium 5-amino-2-chlorobenzenesulfonate | 69.5 | 95.5 | 1.86 | 3 | 9.23 | 3 | 1 | 1 | 50 |
| 6 | Cadmium p-fluorobenzenesulfonate | 113.5 | 149.0 | 2.54 | [1] 2 | 15.41 | 3 | 3 | 2 | 60 |
| 9 | Cadmium 5-amino-o-toluenesulfonate | 146.0 | 170.5 | 1.75 | 5 | 7.93 | 3 | 7 | 0 | 100 |

[1] 2 gm./gal. of acidified $H_2O$ (pH 6.2).

TABLE IX.—EFFICACY OF CADMIUM BENZENE SULFONATES FOR THE REMOVAL OF *Echinococcus Multilocularis* FROM EXPERIMENTALLY INFECTED DOGS

[Note: Litter-mate dogs were selected and infected experimentally with *Echinococcus multilocularis* by feeding cystic material from cotton rats. Seven days after infection one dog in each pair was given feed medicated with the selected compound. The other dog of each pair was maintained as a control. The infection resulted promptly in symptoms such as diarrhea and in the case of the controls lead to severe diarrhea, loss of weight and death.]

| Compound | Drug level used in feed (percent by weight) | Tapeworms at necropsy, number | Effect of treatment on symptoms |
|---|---|---|---|
| Cd, 5-nitro-o-toluenesulfonate. | 0.029 | None | Complete remission. |
| Cd, o-nitrobenzenesulfonate. | 0.15 | ____do____ | Do. |
|  | 0.075 | ____do____ | Do. |
| Cd, 2,4-dinitro-benzenesulfonate. | 0.1 | ____do____ | Do. |

The cadmium sulfonates are conveniently prepared by the portion-wise addition of cadmium oxide to a hot stirred solution of the sulfonic acids in water. The reactants are advisably used in an equimolar ratio or with a slight excess of the sulfonic acid. Sometimes it is necessary to boil the stirred mixture for a few minutes to complete solution of the cadmium oxide. After filtering the reaction mixture, the solution is generally concentrated to a smaller volume and allowed to cool. The cadmium sulfonates crystallize from the solution in the form of hydrated salts. Water of hydration can be removed easily by vacuum drying to give the white anhydrous cadmium sulfonates.

The following examples illustrate the preparation of novel cadmium sulfonates although other cadmium sulfonates are known in the art.

EXAMPLE 1

*Cadmium butanesulfonate*

Cadmium oxide, 13.9 g. 0.108 mole), was added to a stirred solution of 31.3 g. (0.227 mole) of butanesulfonic acid in 150 ml. of water. The resulting solution was heated to boiling, filtered and cooled. The white crystals which separated were filtered and a second crop was isolated. Recrystallization of the combined crops from 20 ml. of 95% ethyl alcohol gave 18.7 g. (44.7%) of white crystals:

Solubility: 1108 g./liter of water.

Calculated for $C_8H_{18}CdO_6S_2$: Cd, 29.06%. Found: Cd, 29.14%.

EXAMPLE 2

*Cadmium p-carbomethoxybenzenesulfonate*

A solution of 92.7 g. (0.429 mole) of p-carbomethoxybenzenesulfonic acid in 100 ml. of boiling water was stirred during the addition of 27 g. (0.21 mole) of cadmium oxide. An additional 150 ml. of water was added and, when all the cadmium oxide did not dissolve, the mixture was filtered. Fine white needles separated immediately to give, after cooling, 67.8 g. (59.5%) of material, which was dried for 15 hours at 138° C./0.2 mm.

Solubility: 79.3 g./liter of water.

Calculated for $C_{16}H_{14}CdO_{10}S_2$: Cd, 20.70%. Found: Cd, 20.79%; Cd, 20.70%.

EXAMPLE 3

*Cadmium p-carboxybenzenesulfonate*

A solution of 61 g. (0.31 mole) of p-sulfobenzoic acid in 70 ml. of boiling water was stirred during the addition of 18.6 g. (0.145 mole) of cadmium oxide. An additional 70 ml. of water was required to complete the solution, which was filtered and allowed to cool. A total yield of 56.3 g. (59.2%) of fine white needles was obtained.

Solubility 286.5 g./liter of water.

Calculated for $C_{14}H_{10}CdO_{10}S_3 \cdot 4H_2O$: Cd, 19.15%. Found: Cd, 19.31%; Cd, 19.35%.

EXAMPLE 4

*Cadmium methanesulfonate*

Cadmium oxide, 67.9 g. (0.529 mole), was added to a stirred solution of 106.7 g. (1.11 mole) of methanesulfonic acid in 240 ml. of water. The resulting solution was heated to boiling, filtered, and evaporated to dryness in vacuo. Recrystallization of the residue twice from 600 ml. of 95% ethyl alcohol gave 16.5 g. (10.3%) of white crystals.

Solubility: 1451.5 g./liter of water.

Calculated for $C_2H_6CdO_6S_2 \cdot 2H_2O$: Cd, 33.19%. Found: Cd, 33.30%; Cd, 33.28%.

The anhydrous material was obtained by drying a sample in vacuo at 130° C. for 12 hours.

Calculated for $C_2H_6CdO_6S_2$: Cd, 37.14%. Found: Cd, 36.91%; Cd, 36.97%.

EXAMPLE 5

*Cadmium p-methoxybenzenesulfonate*

Cadmium oxide, 28.0 g. (0.218 mole), was slowly added to a stirred solution of 86.2 g. (0.458 mole) of p-methoxybenzenesulfonic acid in 240 ml. of water. The stirred mixture, upon heating, formed a solution which was filtered and cooled. A white precipitate formed which was filtered and air dried. A second crop was isolated and the two crops were combined and recrystallized from 250 ml. of water. The white crystals which formed were filtered and oven dried (77.6 g.). A second crop was separated and oven dried. This material weighed 8.9 g. for a total yield of 86.5 g. (81.5%).

Solubility: 69.5 g./liter of water.

The analysis for the first crop showed that the compound contained one and a half molecules of water.

Calculated for $C_{14}H_{14}CdO_8S_2 \cdot 1\frac{1}{2}H_2O$: Cd, 21.87%. Found: Cd, 21.90%.

The analysis for the second crop showed that it existed as the anhydrous product.

Calculated for $C_{14}H_{14}CdO_8S_2$: Cd, 23.09%. Found: Cd, 22.73%.

EXAMPLE 6

*Cadmium p-nitrobenzenesulfonate*

Cadmium oxide, 31.1 g. (0.242 mole), was slowly added to a stirred solution of 103.2 g. (0.508 mole) of p-nitrobenzenesulfonic acid in 500 ml. of water. The resulting mixture was heated to boiling, filtered to remove some undissolved cadmium oxide and allowed to cool. The light yellow crystals which formed were filtered. A second crop was isolated by concentrating the filtrate. The two crystal fractions were combined and recrystallized two times from water to give 79.1 g. (63.3%) of pale yellow crystals which were oven dried at 100° C.

Solubility: 5.5 g./liter of water.

Calculated for $C_{12}H_8CdN_2O_{10}S_2$: Cd, 21.75%. Found: Cd, 21.62%; Cd, 21.68%.

EXAMPLE 7

*Cadmium 2-propanesulfonate*

Cadmium oxide, 14.6 g. (0.114 mole), was added to a stirred solution of 29.8 g. (0.240 mole) of 2-propanesulfonic acid in 100 ml. of water. The solution was heated to boiling, filtered, and cooled. When no crystals formed, the solution was concentrated to dryness in vacuo and the residue was recrystallized from 75 ml. of aqueous ethanol. The white crystals which separated were filtered and recrystallized twice from ethyl alcohol-ether solution to give 15.8 g. (38.6%) of fine white needles.

Solubility: 983 g./liter of water.

Calculated for $C_6H_{14}CdO_6S_2 \cdot \frac{1}{2}H_2O$: Cd, 30.56%. Found: Cd, 30.80%.

EXAMPLE 8

*Cadmium p-thioanisylsulfonate*

Cadmium oxide, 11.2 g. (0.088 mole), was added to a stirred solution of 37.6 g. (0.184 mole) of p-thioanisylsulfonic acid in 120 ml. of water. The resulting solution was heated to boiling, filtered, and cooled. The white crystals which separated were filtered and air dried. A second crop was isolated. Recrystallization of the combined crops from 100 ml. of water gave white crystals which were filtered and oven dried, 38.4 g. (84.4%).

Solubility: 42.3 g./liter of water.

Calculated for $C_{14}H_{14}CdS_4O_6$: Cd, 21.66%. Found: Cd, 21.64%.

EXAMPLE 9

Cadmium o-aminobenzenesulfonate

Cadmium oxide, 16.8 g. (0.131 mole), was added to a stirred, hot solution of 50.0 g. (0.289 mole) of o-aminobenzenesulfonic acid in 1100 ml. of $H_2O$ which had previously been treated with charcoal. The solution was filtered and cooled to give a yellow solid amounting to 25.6 g. Second and third crops amounted to 25.9 g. and 7.5 g. respectively. The three crops were combined and recrystallized from 500 ml. of hot water to give a white product weighing 45.7 g., oven dried it weighed 30.1 g. A second crop was isolated and weighed (11.0 g.); oven dried it weighed 8.5 g. Total yield 38.6 g. (64.5%).

Calculated for $C_{12}H_{12}CdN_2O_6S_2$: Cd, 24.60%. Found (1st crop): Cd, 24.46%; Cd, 24.60%. (2nd crop): Cd, 24.79%; Cd, 24.54%.

EXAMPLE 10

Cadmium 5-amino-2-chlorobenzenesulfonate

Cadmium oxide, 29.1 g. (0.227 mole), was added to a stirred solution of 103.8 g. (0.5 mole) of 5-amino-2-chlorobenzenesulfonic acid in 2.5 l. of hot water. The solution was treated with charcoal, filtered twice and cooled to give a white solid amounting to 54.8 g. Second and third crops, weighing 51.9 g. and 11.0 g. respectively were isolated by concentrating the filtrates. The three crops were combined and recrystallized from 600 ml. of boiling water to give 88.1 g. of material. Second and third crops were isolated and weighed 15.7 g. and 5.0 g. respectively. The crops were oven dried to give a total yield of 88.3 g. Solubility 18.5 g./l. of water. The second and third crops were not pure and were discarded. Total yield 70.5 g. (59.1%).

Calculated for $C_{12}H_{10}CdCl_2N_2O_6S_2$: Cd, 21.38%. Found: Cd, 21.05%; Cd, 21.26%.

EXAMPLE 11

Cadmium 4-amino-m-toluenesulfonate

A solution of 100 g. (0.487 mole) of 4-amino-m-toluenesulfonic acid in 1100 ml. of water was stirred and heated to boiling during the addition of 28.4 g. (0.221 mole) of cadmium oxide. The solution was filtered, decolorized with charcoal and concentrated to approximately half the volume. After cooling to 0° C., 70.3 g. of a white solid separated. Concentration of the filtrate to half volume gave a second crop amounting to 41.4 g. These fractions were recrystallized from water to give 48.1 g. of white crystals.

Calculated for $C_{14}H_{16}CdN_2O_6S_2 \cdot 2H_2O$: Cd, 21.58%. Found: Cd, 21.60%; Cd, 21.71%.

A sample of this material was dried at 133° C./0.1 mm. for 24 hours.

Calculated for $C_{14}H_{16}CdN_2O_6S_2$: Cd, 23.18%. Found: Cd, 23.12%; Cd, 23.02%.

A second fraction amounting to 4.7 g. was obtained by concentrating the filtrate. This material was recrystallized from water to give 19.7 g. of white crystals.

Calculated for $C_{14}H_{16}CdN_2O_6S_2 \cdot 2H_2O$: Cd, 21.58%. Found: Cd, 21.52%; Cd, 21.69%.

A sample of this material was dried at 123° C./0.1 mm. for 24 hours.

Calculated for $C_{14}H_{16}CdN_2O_6S_2$: Cd, 23.18%. Found: Cd, 23.47%; Cd, 23.34%.

The total yield was 67.8 g. (55.1%).

EXAMPLE 12

Cadmium 6-amino-m-toluenesulfonate

Cadmium oxide, 25.7 g. (0.20 mole), was added to a stirred solution of 78.6 g. (0.42 mole) of 6-amino-m-toluenesulfonic acid in 1800 ml. of boiling water. The hot solution was filtered, concentrated to two thirds volume and cooled in a refrigerator. The precipitate that formed was removed by filtration and vacuum dried, 25.2 g. Successive concentration of the filtrates to approximately half volume and cooling gave fractions weighing 16.8 g., 25.0 g., 6.6 g., and 6.7 g. respectively. These fractions were combined and recrystallized from water twice to give a total of 40.2 g. (43.5%) of white crystals. The amounts of material obtained and analytical results are as follows.

Calculated for $C_{14}H_{16}CdN_2O_6S_2$: Cd, 23.18%. Found (Fraction 1; 16.8 g.): Cd, 23.37%. Found (Fraction 2; 15.0 g.): Cd, 23.54%; Cd, 23.63%.

Calculated for $C_{14}H_{16}CdN_2O_6S_2 \cdot 3H_2O$: Cd, 20.86%. Found (Fraction 3; 7.1 g.): Cd, 20.87%; Cd, 21.33%.

Calculated for $C_{14}H_{16}CdN_2O_6S_2 \cdot 1H_2O$: Cd, 22.35%. Found (Fraction 4; 3.3 g.): Cd, 22.44%; Cd, 22.61%.

Solubility=5.9 g./l.

EXAMPLE 13

Cadmium 5-amino-o-toluenesulfonate

Cadmium oxide 31.7 g. (0.247 mole), was added to a hot, stirred solution of 100 g. (0.543 mole) of 5-amino-o-toluenesulfonic acid in 1500 ml. of water. The solution was treated with charcoal, filtered twice and cooled to give a tan precipitate amounting to 90.4 g. Second and third crops weighed 26.2 g. and 7.3 g. respectively. The three crops were combined and recrystallized from 2.3 l. of water to give 28.8 g. Second and third crops amounted to 55.3 g. and 17.4 g. respectively. The crops were oven dried for 3 hours and they then weighed a total of 90.4 g. (75.5%).

Solubility: 23.3 g./l. of water.

Calculated for $C_{14}H_{16}CdN_2O_6S_2$: Cd, 23.18%. Found (1st crop): Cd, 22.91%, Cd, 23.06%. (2nd crop): Cd, 23.01%, Cd, 22.95%. (3rd crop): Cd, 23.29%, Cd, 23.22%.

EXAMPLE 14

Cadmium p-carbethoxybenzenesulfonate

Cadmium oxide, 28.9 g. (0.255 mole), was added to a stirred, hot solution of 114.0 g. (0.495 mole) of p-carbethoxybenzenesulfonic acid in 1 liter of absolute ethyl alcohol. The mixture was heated to reflux for 15 minutes and 300 ml. of water was added to complete solution. After filtering, the filtrate was concentrated and cooled to give a white solid amounting to 42.0 g. A second crop weighed 39.8 g. The two crops were combined and recrystallized from 1 liter of absolute ethyl alcohol to give 62.6 g. of white crystals; oven dried the fraction weighed 33.9 g. A second crop, after oven drying, weighed 14.7 g. Total yield 48.6 g. (37.9%). Solubility: 477.8 g./liter of water.

Calculated for $C_{18}H_{18}CdO_{10}S_2$: Cd, 19.69%. Found: Cd, 19.78%; Cd, 19.79%.

EXAMPLE 15

Cadmium p-fluorobenzenesulfonate

Cadmium oxide, 10.0 g. (0.078 mole), was added to a hot stirred solution of 28.8 g. (0.136 mole) of p-fluorobenzenesulfonic acid and 100 ml. of absolute ethyl alcohol. Ten milliliters of water were added to dissolve the solid. The solution was filtered, concentrated and cooled to give 37.4 g. of a white solid. This crop was recrystallized from 400 ml. of absolute ethyl alcohol and absolute methyl alcohol to give 16.3 g. of material; oven dried it weighed 15.6 g.

Calculated for $C_{12}H_8CdO_6S_2$: Cd, 24.29%. Found: Cd, 24.50%; Cd, 24.46%.

Solubility: 301.8 g./l.

EXAMPLE 16

*Cadmium p-iodobenzenesulfonate*

Cadmium oxide, 5.4 g. (0.0423 mole), was added to a stirred, hot solution of 25.0 g. (0.093 mole) of p-iodobenzenesulfonic acid and 100 ml. of aqueous ethyl alcohol. The solution was heated to boiling, filtered and concentrated to give a white solid amounting to 10.3 g. Second and third crops were isolated and weighed 8.4 g. and 2.3 g., respectively. The three crops were combined and recrystallized from 175 ml. of aqueous methyl alcohol. Three crops were obtained amounting to 3.6 g., 10.0 g. and 8.1 g., respectively. The combined crops were oven dried and weighed 11.1 g. (40.7%).

Calculated for $C_{12}H_8CdI_2O_6S_2 \cdot 2H_2O$: Cd, 16.04%. Found: Cd, 16.11%.

Solubility: Less than 6 g. per liter of water.

EXAMPLE 17

*Cadmium 5-nitro-2-chlorobenzenesulfonate*

A solution of 45 g. (0.189 mole) of 5-nitro-2-chlorobenzenesulfonic acid in 45 ml. of hot water was stirred during the addition of 11.6 g. (0.090 mole) of cadmium oxide. The mixture was heated to boiling and stirred until solution was completed and then filtered. Charcoal was added to decolorize the solution which was filtered twice and cooled to 0° C. The large white crystals that formed were removed by filtration and vacuum dried, 26.0 g. This product was recrystallized from 30 ml. of water and gave 20.4 g. of fine white crystals which were vacuum dried.

Calculated for $C_{12}H_{26}CdCl_2N_2O_{10}S_2 \cdot 2H_2O$: Cd, 18.08%. Found: Cd, 18.11%; Cd, 18.16%.

A sample was dried at 100° C./0.1 mm.

Calculated for $C_{12}H_{26}CdCl_2N_2O_{10}S_2$: Cd, 19.19%. Found: Cd, 18.94%.

The second and third crops of crystals, isolated from the filtrate, were combined and recrystallized from 10 ml. of water to give 4.2 g. of white crystals which were vacuum dried.

Calculated for $C_{12}H_6CdCl_2N_2O_{10}S_2 \cdot 1H_2O$: Cd, 18.62%. Found: Cd, 18.41%; Cd, 18.30%.

A sample was dried at 100° C./0.1 mm.

Calculated for $C_2H_6CdCl_2N_2O_{10}S_2 \cdot 1H_2O$: Cd, 18.62%. Found: Cd, 18.51%.

The total yield of this reaction was 24.6 g. (46.7%). The solubility of the product was 100 g./l. of water.

EXAMPLE 18

*Cadmium 5-nitro-o-toluenesulfonate*

Cadmium oxide, 140.7 g. (1.096 moles), was added to a hot solution of 500 g. (2.30 moles) of 5-nitro-o-toluenesulfonic acid in 250 ml. of water, which had previously been treated with charcoal. The mixture was heated to reflux for 10 minutes, filtered and cooled to give 554.0 g. of white crystals. Second and third crops were isolated and weighed 71.7 g. and 44.5 g. respectively. The first crop was recrystallized from 500 ml. of water and cooled to give 323.1 g. of white crystals. A second crop was isolated and weighed 95.0 g. The original second and third crops were combined and recrystallized from 100 ml. of water to give 64.8 g. of white crystals. The recrystallized second crop was recrystallized from 75 ml. of water to give 52.8 g. of white crystals. The crops were combined and amounted to a total yield of 440.7 g. (73.8%).

Calculated for $C_{14}H_{12}CdN_2O_{10}S_2 \cdot 3\frac{1}{2}H_2O$: Cd, 18.49%. Found: Cd, 18.40%; Cd, 18.50%.

EXAMPLE 19

*Cadmium 2-amino-3,5-dimethylbenzenesulfonate*

A solution of 84.5 g. (0.14 mole) of 2-amino-3,5-dimethylbenzenesulfonic acid in 2300 ml. of boiling water was stirred during the addition of 25.7 g. (0.20 mole) of cadmium oxide. The boiling solution was filtered, concentrated to 1100 ml. and then cooled to 0° C. for 18 hrs. The crystals that separated weighed 80.9 g. and were recrystallized from water to give three crystal fractions. The total yield of material was 71.7 g. (69.9%). The fractions and analytical data are as follows.

Calculated for $C_{16}H_{20}CdN_2O_6S_2 \cdot 1H_2O$: Cd, 21.17%. Found (Fraction 1, 43.6 g.): Cd, 20.89%.

Calculated for $C_{16}H_{20}CdN_2O_6S_2 \cdot 2H_2O$: Cd, 20.47%. Found (Fraction 2, 18.0 g.): Cd, 20.48%. Found: (Fraction 3, 10.1 g.): Cd, 20.57%.

Solubility of this material was 9.09 g./l. of water.

EXAMPLE 20

*Cadmium 4-sulfo-2-aminobenzenesulfonate*

A solution of 129.1 g. (0.357 mole) of 2-amino-p-benzenedisulfonic acid (70%) in 740 ml. of hot water was stirred during the addition of 21.8 g. (0.17 mole) of cadmium oxide. The hot solution was filtered, decolorized with charcoal and cooled to 0° C. The crops of white crystals were obtained weighing 40.9 g. and 105.8 g. respectively. These fractions were combined and recrystallized from water to give three crops of crystals weighing a total of 57.7 g. These three crystal fractions were combined and recrystallized from water to give 28.8 g. (27.4%) of white crystals after drying for 2 hrs. in vacuum oven at 100° C.

Calculated for $C_{12}H_{12}CdN_2O_{12}S_4 \cdot 3H_2O$: Cd, 16.50%. Found: Cd, 16.64%; Cd, 16.43%.

Drying this material over phosphorus pentoxide at 100° C./0.1 mm. did not improve the cadmium analysis. The solubility of this product was 1429 g./l. of water.

EXAMPLE 21

*Cadmium 6-thymolsulfonate*

A solution of 87.0 g. (0.378 mole) of 6-thymolsulfonic acid in 175 ml. of boiling water was stirred during the addition of 23.1 g. (0.180 mole), of cadmium oxide. The hot solution was filtered, decolorized with charcoal, filtered twice more, concentrated to approximately one half volume and cooled to 0° C. A white precipitate amounting to 26.4 g. separated. By successive concentrations of the filtrate and cooling, three more crops were obtained. The four fractions were combined and recrystallized from water to give a total of 25.2 g. (25.8%) of white crystals. These fractions together with the analytical data are as follows.

Calculated for $C_{20}H_{26}CdO_8S_2 \cdot 2H_2O$: Cd, 18.82%. Found (Fraction 1, 3.4 g.): Cd, 18.50%; Cd, 18.75%. Found (Fraction 2, 7.6 g.): Cd, 18.73%; Cd, 18.77%. Found (Fraction 3, 14.2 g.): Cd, 18.39%; Cd, 18.81%.

A sample of fraction 3 was dried for 4 hours at 100° C./0.1 mm.

Calculated for $C_{20}H_{26}CdO_8S_2$: Cd, 19.69%. Found: Cd, 19.61%.

Solubility of this material was 250 g./l. of water.

EXAMPLE 22

*Cadmium 1-carboxypentadecanesulfonate (inner salt)*

Cadmium oxide, 20.5 g. (0.160 mole), was added to a stirred solution of 113.1 g. (0.366 mole) of α-sulfopalmetic acid in 600 ml. of $H_2O$. The mixture was heated to boiling, filtered and cooled. Ethyl alcohol was added as a percipitating agent. The white precipitate was filtered, air dried and weighed 31.3 g. (25.0%).

Calculated for $C_{16}H_{30}CdO_5S \cdot 1\frac{1}{2}H_2O$: Cd, 23.72%. Found: Cd, 23.56%.

EXAMPLE 23

*Cadmium 2-nitrobutane-1-sulfonate*

Cadmium oxide, 2.3 g. (0.18 mole), was added to a hot stirred solution of 9.1 g. (0.05 mole) of 2-nitrobutane-1-sulfonic acid, in 70 ml. of water. The solution was heated to reflux for 10 minutes, filtered and evaporated to dryness to give a white solid amounting to 9.7 g. This crop was recrystallized from 40 ml. of absolute ethyl alcohol-ether solution to give 6.8 g. (79.5%) of white crystals. Solubility 333.3 g./l. of water.

Calculated for $C_8H_{18}CdN_2O_{10}S_2 \cdot 2H_2O$: Cd, 21.92%. Found: Cd, 21.70%; Cd, 21.87%.

EXAMPLE 24

*Cadmium 2,4-dinitro-1-naphthol-7-sulfonate*

A solution of 25 g. (0.0796 mole) of 2,4-dinitro-1-naphthol-7-sulfonic acid in 50 ml. of water was stirred at reflux temperature during the addition of 4.9 g. (0.0379 mole) of cadmium oxide. The boiling solution was decolorized with charcoal and cooled to 0° C. for 18 hours. Successive concentrations of this solution and the filtrate give crops of white crystals weighing 4.9 g. and 5.9 g. respectively. These two fractions were combined and recrystallized from 25 ml. of water to give 2 crops of crystals which weighted 2.9 g. and 1.8 g. respectively after drying for 2 hrs. at 100° C. in a vacuum oven.

Calculated for $C_{20}H_{10}CdN_4O_{16}S_2 \cdot 1H_2O$: Cd, 14.85%. Found (Fraction 1): Cd, 14.85%; Cd, 14.78%. Found (Fraction 2): Cd, 15.49%.

Samples of these materials were dried for 5 hrs. at 100° C./0.1 mm. over phosphorus pentoxide. The analytical data were unchanged.

EXAMPLE 25

*Cadmium 2,4-dinitrobenzenesulfonate*

Cadmium oxide, 12.4 g. (0.096 mole), was added to a hot stirred solution of 50.0 g. (0.202 mole) of 2,4-dinitrobenzenesulfonic acid in 100 ml. of absolute ethyl alcohol. The cadmium oxide which did not go into solution was removed by filtration and the filtrate was cooled. The white solid which separated was isolated by filtration and air dried, 19.0 g. Second and third crops weighed 6.4 g. and 9.2 g. respectively. The three crops were combined and recrystallized from 70 ml. of absolute ethyl alcohol and the white crystals which separated were isolated by filtration and air dried, 2.4 g.

The second crop weighed 19.6 g. The crystal fractions were combined and oven dried.

Total yield 21.4 g. (36.8%).
Solubility: 857 g./l. of water.
Calculated for $C_{12}H_6CdN_4O_{14}S_2 \cdot 3H_2O$: Cd, 17.01%. Observed: Cd, 17.08%; Cd. 17.07%.

A sample was dried over phosphorus pentoxide under vacuum at 133° C. for 19 hrs, and analyzed.

Calculated for $C_{12}H_6CdN_4O_{14}S_2 \cdot 1H_2O$: Cd, 17.99%. Observed: Cd, 17.82%; Cd, 17.84%.

EXAMPLE 26

*Cadmium o-nitrobenzenesulfonate*

Cadmium oxide, 52.4 g. (0.408 mole), was added to a stirred hot solution of 207.1 g. (1.019 moles) of o-nitrobenzenesulfonic acid in 400 ml. of absolute ethyl alcohol. The solution was filtered twice and cooled and the white solid which separated was isolated by filtration, 138.0 g. A second crop weighed 74.0 g. The first crop was recrystallized from 200 ml. of absolute ethyl alcohol to give white crystals amounting to 110.0 g. The second crop was recrystallized from 110 ml. of absolute ethyl alcohol to give white crystals amounting to 34.3 g. The filtrates of the two recrystallized crops were combined and concentrated to give a white solid which weighed 17.0 g. The weights of the 3 crops after oven drying and the analysis are listed below.

Calculated for $C_{12}H_8CdN_2O_{10}S_2 \cdot 2H_2O$: Cd, 20.33%. Fraction 1, 99.8 g.: Cd, 20.22%; Cd, 20.30%. Fraction 2, 31.2 g.: Cd, 20.23%; Cd, 20.17%. Fraction 3, 15.3 g.: Cd, 20.29%; Cd, 20.23%.

Total yield 146.3 g. (69.4%).
Solubility: 1298 g./l. of water.

A sample was dried over phosphorus pentoxide at 133° C. under vacuum for 19 hrs. and analyzed.

Calculated for $C_{12}H_8CdN_2O_{10}S_2$: Cd, 21.75%. Observed: Cd, 21.69%; Cd, 21.79%.

What is claimed is:

1. A method of eliminating helminths from an animal infected therewith which comprises supplying the animal with drinking water containing at least one aromatic sulfonic acid water soluble cadmium salt of the formula

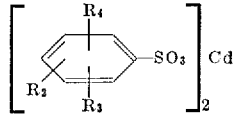

and

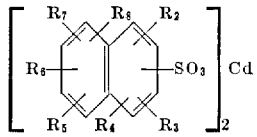

wherein $R_2$, $R_3$, $R_4$, $R_5$, $R_6$, $R_7$ and $R_8$ are members of the group consisting of hydrogen, halogen, lower alkyl, hydroxy, lower alkoxy, amino, nitro, carboxy, carb-lower alkoxy, sulfo, mercapto and lower alkylthio groups in a concentration adequate to kill the helminths without having an appreciable toxic effect on the animal and for a time of at least 24 hours but not over a period sufficient to produce serious adverse effects to the animal.

2. A method of eliminating helminths from an animal infected therewith which comprises supplying the animal with drinking water containing at least one water soluble aliphatic sulfonic acid cadmium salt of the formula

wherein $R_1$ is a member of the group consisting of straight and branched alkyl groups of 1 to 16 carbons and such alkyl groups substituted with a member of the group consisting of carboxy, carb-lower alkoxy, halogen, amino, sulfo, nitro, hydroxy, mercapto, lower alkylthio and lower alkoxy groups, in a concentration adequate to kill the helminths without having an appreciable toxic effect on the animal, and for a time of at least 24 hours but not over a period sufficient to produce serious adverse effects in the animal.

3. The method of claim 1 in which the drinking water contains 0.1 to 1.50 gm. of cadmium metal in the form of said cadmium sulfonate, per gallon of water.

4. The method of claim 2 in which the drinking water contains 0.1 to 1.50 gm. of cadmium metal in the form of said cadmium sulfonate, per gallon of water.

5. The method of eliminating helminths from an animal infected therewith which comprises orally supplying the animal with 3-carboxy-4-hydroxybenzenesulfonate in an amount sufficient to kill the helminths.

References Cited by the Examiner

UNITED STATES PATENTS

| | | | |
|---|---|---|---|
| 2,696,455 | 12/1954 | Blair | 167—53 |
| 2,713,589 | 7/1955 | Radcliffe | 260—429 |
| 2,850,426 | 9/1958 | Hereld | 167—55 |
| 2,868,692 | 1/1959 | Bach | 167—55 |
| 2,872,469 | 2/1959 | Stevens | 260—429 |

JULIAN S. LEVITT, *Primary Examiner.*

MORRIS O. WOLK, FRANK CACCIAPAGLIA, JR., LEWIS GOTTS, *Examiners.*